United States Patent
Drzala

[15] 3,640,307
[45] Feb. 8, 1972

[54] APPARATUS FOR BALANCING FLUID DISTRIBUTION SYSTEMS

[72] Inventor: Raymond J. Drzala, New Britain, Conn.
[73] Assignee: Allied Thermal Corporation, New Britain, Conn.
[22] Filed: Feb. 24, 1970
[21] Appl. No.: 13,482

[52] U.S. Cl. ............................137/557, 137/601, 49/74, 73/205, 98/110
[51] Int. Cl. .................F61k 37/00, F16k 47/10, F24f 13/14
[58] Field of Search .................49/74, 95; 98/110; 73/205; 137/557, 601

[56] References Cited

UNITED STATES PATENTS 1,236,966  8/1917   Minetti et al. .................98/110 UX
2,101,165  12/1937  Cole et al. ...................73/212
2,706,409  4/1955   Preston........................73/212
3,196,895  7/1965   Dayus.........................137/601 X
3,286,732  11/1966  Alley.........................137/601
3,495,521  2/1970   Foster........................137/601 X Primary Examiner—Henry T. Klinksiek
Attorney—Charles B. Smith

[57] ABSTRACT

Apparatus for balancing the flow of a gaseous substance in the branch of a fluid distribution system comprising a set of variable gates to regulate the volume flow input, a screen to establish a pressure differential along the length of the unit and a pressure differential measuring system capable of detecting and measuring the pressure drop in the unit due to the screen as a function of the input flow rate and to allow regulation of the output flow by altering the input flow rate in accordance with prior calibration of the measuring system.

2 Claims, 5 Drawing Figures

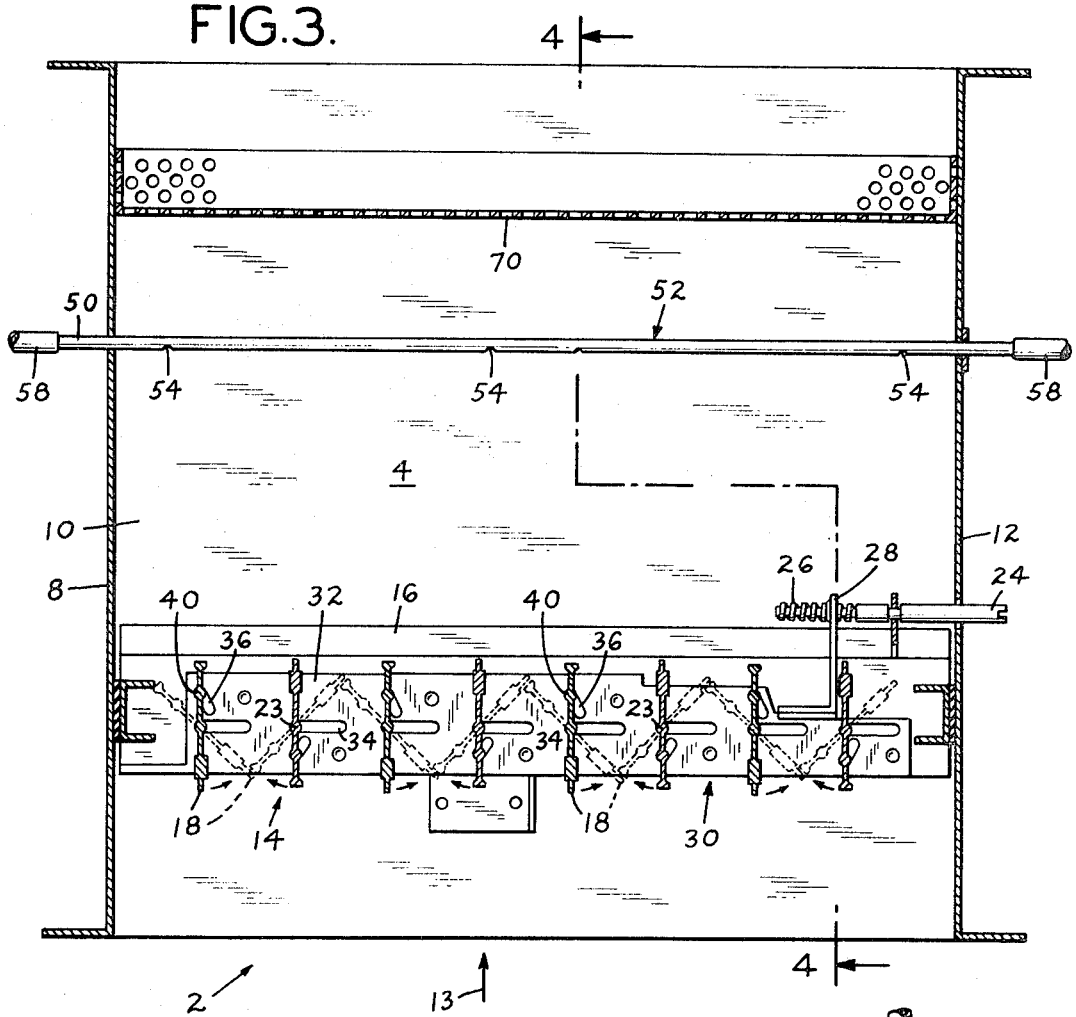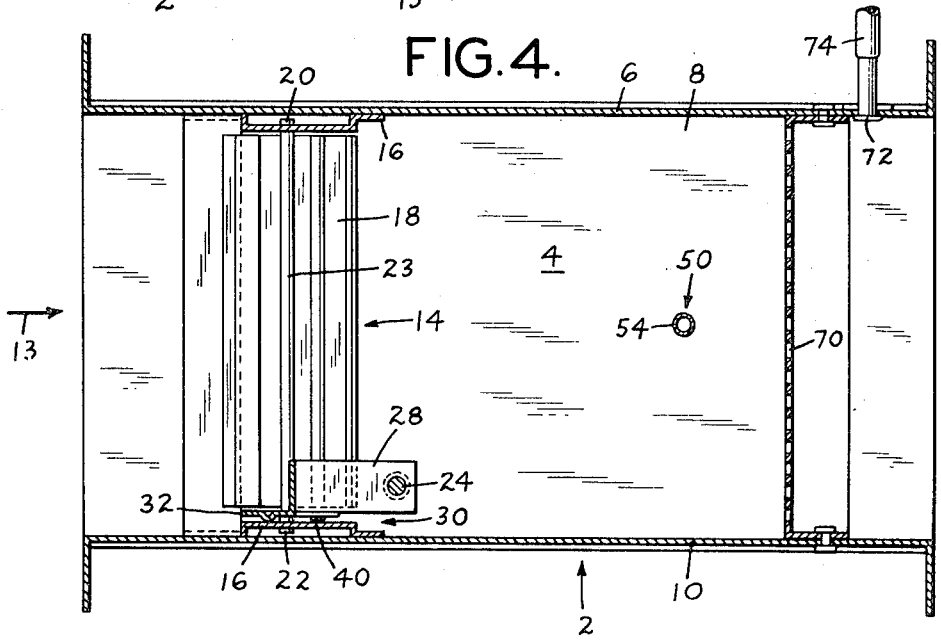

APPARATUS FOR BALANCING FLUID DISTRIBUTION SYSTEMS

BACKGROUND OF THE INVENTION

This invention relates to gaseous flow balancing units which are inserted into branches of a fluid distribution system to balance the system and regulate the output of each branch. Specifically this invention relates to an air volume measurement and balancing unit which can be inserted into each branch of an air distribution system to allow rapid and inexpensive balancing of the fluid flow into each branch of the system. Most buildings today have air distribution systems, comprising a fan and a duct system to deliver the air from the input duct, where it is being drawn in by the fan, to the individual rooms or zones. When such a system is installed, the zone nearest the fan receives a great deal more air than zones farther away from the fan. This results in overairing certain zones and underairing others. This is particularly undesirable if the zones which require the most air are located at a distance from the intake fan. Accordingly, it is possible to partially close the ducts nearest the fan to prevent excessive air flow to areas fed by these ducts, and therefore to detour a portion of the air to other zones further away from the intake fan. If only a crude air system balance is necessary, this type of arrangement is adequate.

However, as one approaches the point where the number of zones to be fed from a given fan are such as to essentially consume the total output of the fan, it becomes necessary to allocate a given amount of air to each zone, depending on the use to which the zone is put, the number of people in the zone, and the general layout of the zone. It therefore becomes necessary to develop a more sophisticated method of balancing the system to properly allocate the air. Because a variation in any one branch of a conventional air conditioning system will result in an alteration in all other branches, it is important to utilize specialists to take measurements to balance the system while it is in operation, so as to achieve optimal airing of all zones. However, this procedure is expensive and time consuming. Furthermore, it has the disadvantage that if a zone is in any way altered so as to require different airing, the entire system will have to be rebalanced. Furthermore, it is objectionable because in order to properly balance a system, many readings have to be taken.

BRIEF DESCRIPTION OF THE INVENTION

The problem of balancing a multiduct fluid distribution system is lessened by the instant invention. The instant invention contemplates placing a volume measurement and air balancing unit at any convenient location within the fluid distribution system. The unit employs a series of vanes which can be opened and closed to regulate the amount of fluid which is allowed to enter the unit. Downstream of the vanes is a screen which establishes a pressure differential between its upstream side and its downstream side and a pressure differential measuring device which is capable of measuring the pressure drop across the screen.

As the quantity of input fluid decreases the pressure differential also decreases. The pressure differential therefore can be used to indicate the fluid inflow and, by knowing the pressure drop across the screen, can be employed to effectively regulate the fluid flowing out from the duct. The apparatus can all be located in one room in close proximity to the fan. Therefore, the balancing of the system zones can be effectively accomplished without leaving the room.

It is an object of this invention to provide an inexpensive and accurate apparatus for balancing the various branches of a fluid distribution system.

It is a further object of this invention to provide an apparatus which can measure and control the flow of fluid through the branch in which it is inserted.

It is a still further object of this invention to allow rebalancing of a fluid distribution system in a short time and without incurring great expense.

BRIEF DESCRIPTION OF THE DRAWINGS

FIG. 3 is an elevated cross section taken along line 3—3 of FIG. 1.

FIG. 4 is a longitudinal cross section taken along line 4—4 of FIG. 1 and FIG. 3.

DETAILED DESCRIPTION OF AN ILLUSTRATIVE EMBODIMENT

Figure 1:
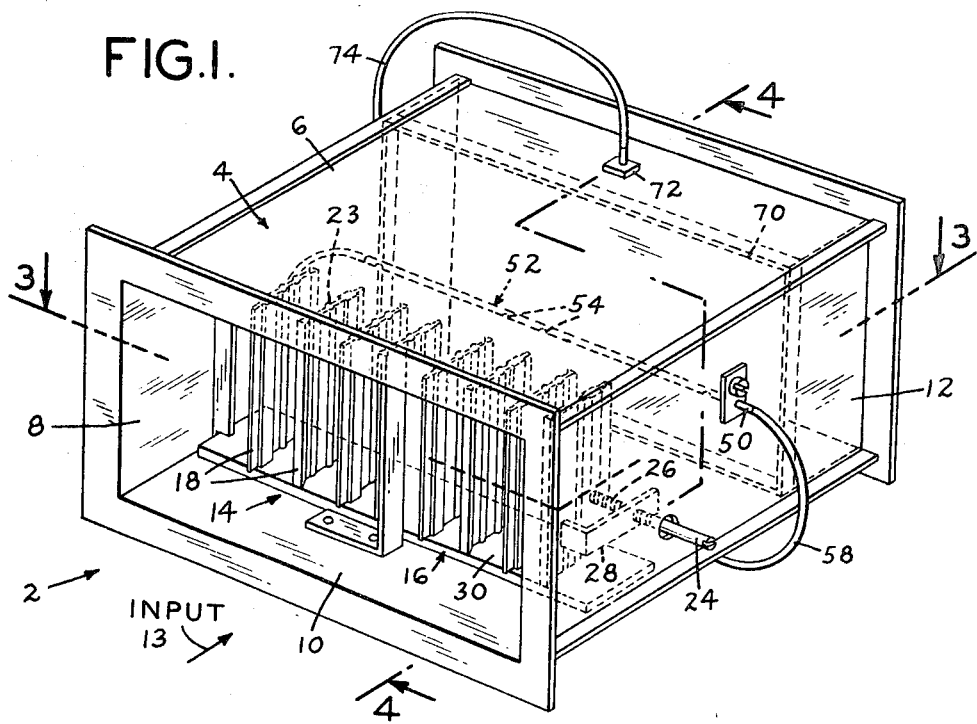
FIG. 1 is a perspective view of the balancing unit coupled to a differential pressure gauge, viewed from the input end.
Figure 2:
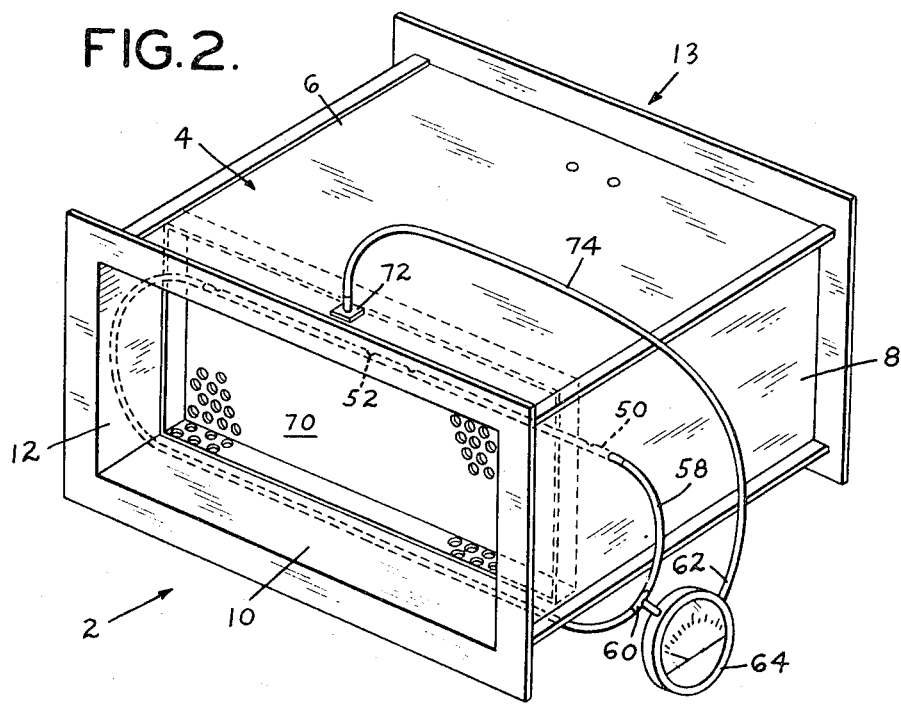
FIG. 2 is a perspective view of the balancing unit as seen from the output end.

Referring to FIG. 1 and FIG. 2, there is shown a volume measurement unit generally designated 2. The unit is encased in a housing 4 whose inner cross-sectional area is substantially equal to the inner cross-sectional area of the output duct to which it will be connected. The housing is substantially rectangular or square in cross section and has four sides 6, 8, 10 and 12 to form a substantially rectangular or square duct which is open at both of its cross-sectional ends. Air enters the unit from the input end 13.

A variable damper assembly 14 permits a greater or lesser amount of fluid to flow into the unit. As can best be seen in FIG. 3, and FIG. 4, the damper assembly consists of a frame 16 whose outside dimensions are substantially similar to the inside dimensions of the rectangular or square housing 4. A number of vanes 18 are pivotally attached to the frame 16. Each vane 18 has an upper 20 and lower 22 cylindrical stump, each stump having its central axis aligned with and substantially superimposed upon the central longitudinal axis 23 of the vane 18. Each vane 18 has its central longitudinal axis parallel to every other vane and in a preferred embodiment the central longitudinal axes are separated by a distance approximately 0.7 times the depth of any individual vane 18. All of the vanes 18 are substantially identical in depth. This relationship, of course, depends on the number of vanes used and the distance across the housing. In general, the 0.7 to 1 separation-to-depth ratio provides a damper structure which when fully closed presents a series of right-angle buttressed vanes, whereas when wide open provides a maximum amount of airflow with a minimum amount of turbulence due to the interposition of the vanes into the fluid stream.

The vanes 18 are connected to a damper adjustment rod 24 which when turned can open or close the damper structure. The adjustment rod is affixed to a screw 26 such that the longitudinal axis of the screw and the rod are coincident. The screw 26 is affixed by means of a bracket 28 to lower slide-plate assembly 30. The lower slide-plate assembly 30 comprises a plate 32 having a plurality of apertures 34 and 36. Apertures 34 are situated approximately 0.7 times the depth of any individual vane from one another and are substantially disposed at equal distances from one another along the longitudinal central axis of the plate. Apertures 36 are disposed alternately on either side of the central longitudinal axis of the plate on lines through the center of each aperture 34 and perpendicular to the central longitudinal axis of the plate 30. When the adjustment rod 24 is turned, the screw 26 is turned in the corresponding direction. This forces the bracket 28 to move laterally in response to the circular motion of the screw. Each of the vanes is provided with a nub arranged to enter a corresponding one of the apertures 36. Thus, when the adjustment rod is turned in any given direction, no two adjacent dampers will pivot in the same arcuate direction because the nubs are being alternately pulled and pushed by the movement of apertures 36. Other damper systems for permitting a greater or lesser amount of fluid to flow into the unit may be employed. For example, the damper structure disclosed in U.S. Pat. No. 2,833,200 issued to E. Olsen et al. for a Control Register for Air Conditioning Apparatus, may be employed in the instant invention to regulate the amount of fluid which flows through the unit.

A total pressure indicator 50 is disposed downstream of the damper structure. The indicator 50 must be a sufficient distance downstream of the damper to allow the turbulence created by the damper structure to subside and thereby provide a linear measurement of the flow of fluid across any dimension of the housing. The indicator 50 measures the total pressure of the air column through the unit. The indicator 50 consists of a hollow tube 52 substantially smaller in diameter than the cross-sectional dimensions of the housing 4. The tube 52 has four sensing apertures 54 along its length. Each sensing aperture 54 is so positioned as to face directly into the airstream. Each of two of the four apertures is located within 1 inch of sidewalls 8 and 12 whereas each of the other two sensing apertures are located within 2 to 7 inches from the sidewalls 8 and 12, depending on the width of the housing. The total pressure indicator 50 extends across the width of the housing, such that it is disposed in a plane substantially coincident with the plane of the cross section of the housing, and intersects the sidewalls 8 and 12 of the housing perpendicularly. The indicator 50 extends a short distance outside of the housing 4. Tubing 58 is connected at either end of the indicator and is joined together by a common "T" 60. The output end of the common "T" is connected to one arm of a differential pressure gauge 64.

Downstream of the pressure indicator 50 is a screen 70, disposed substantially perpendicularly to the direction of flow of the fluid column, and having a free area of between 48 percent and 53 percent. Due to the static pressure drop across the screen 60, the pressure on the upstream side of the screen will differ from the pressure on the downstream side, the latter pressure being less than the pressure on the upstream side. A static pressure indicator 72 extends through one of the walls of the housing approximately 2 inches downstream of the screen and is flush with the inner surface of the wall. The indicator 72 measures the static pressure of the fluid which has traversed the screen. The indicator 72 is disposed substantially perpendicular to the direction of the airflow. This permits it to reflect the static fluid pressure without being influenced by the total air velocity pressure. The static pressure indicator 72 extends a short distance outside of the housing. Tubing 74 is connected to the static pressure indicator 72. The other end of the tubing 74 is attached to the other arm 62 of the differential pressure gauge.

By subtracting the pressure sensed by the static pressure indicator from the pressure detected by the dynamic pressure indicator and calibrating the differential pressure gauge appropriately, the fluid volume passing through the unit can be ascertained. This differential pressure can conveniently be called the calibrated or calibration pressure. The calibration of the differential pressure gauge is such that it yields a measurement of the duct velocity in feet per minute through the unit. By multiplying the velocity in feet per minute by the cross-sectional area in square feet of the unit, it is possible to obtain a measure of the fluid volume in cubic feet per minute. Therefore, by regulating the amount of input air by controlling the dampers, one can adjust them until a calibrated differential pressure reading on the differential pressure gauge is obtained which corresponds to the desired fluid velocity and volume required to balance the particular zone.

Figure 5:
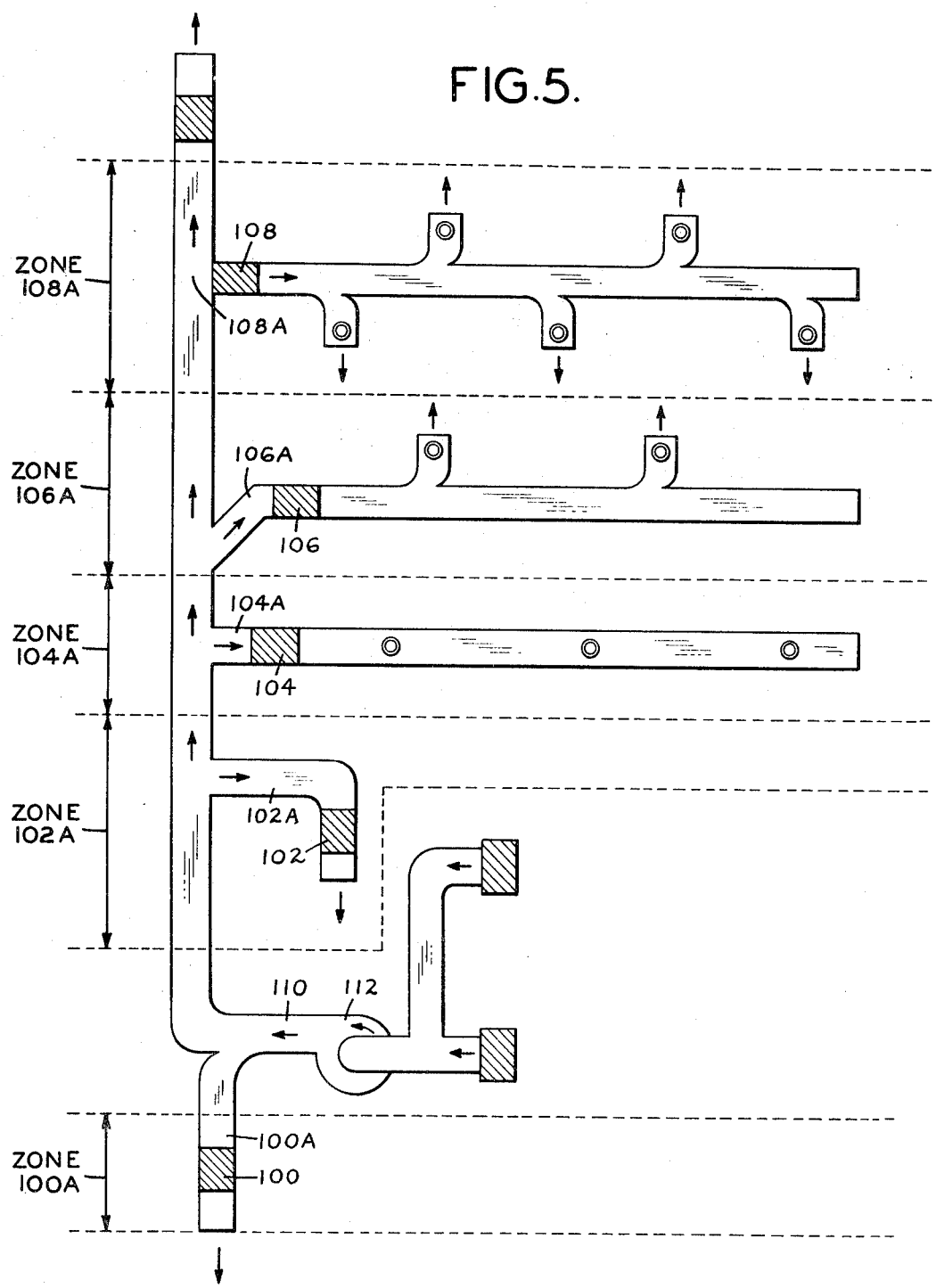
FIG. 5 is a schematic representation of a five zone air distribution system.

Referring to FIG. 5, there is shown a typical air distribution system. In operation, a fluid balancing unit 100, 102, 104, 106, 108 is inserted in each branch, 100A, 102A, 104A, 106A, 108A of the air distribution system.

To balance the system, all units 100–108 are set to the fully opened position. This means that the vanes on the damper structure are adjusted to the full open position. This offers the least resistance and provides maximum airing for those zones nearest the intake fan 112. The zones 100A, 102A nearest the intake fan are normally overaired and those zones 104A, 106A, 108A which are further away from the fan are normally underaired. Overairing and underairing are, of course, relative terms which depend on the use to which the zone is to be put. Prior to installation of the balancing units, it is important to determine how much fluid each zone is to receive, as was discussed before.

Let us presume that air is the fluid, that the first zone 100A requires 200 cubic feet of air per minute and that there is installed a 6×6 inch unit 100 in the duct feeding air to the zone. In order to achieve 200 cubic feet per minute in a duct cross-sectional area of 0.25 square feet it is necessary to have a duct velocity of 800 ft. per minute. This corresponds to a specific reading on the differential pressure gauge which has been empirically determined. Assume that the required differential pressure reading is 0.17 inches and that the zone 100 at present is overaired and a reading of 0.5 inches is shown on the differential pressure gauge. By closing the damper structure until the differential pressure gauge reads 0.17 the required flow will be obtained. This reading should be ascertained after the air flowing through the unit has reached equilibrium and not upon the immediate adjustment of the damper structure. This assures a flow of air of approximately 200 cubic feet per minute exiting from the particular unit.

The next overaired zone 102A is adjusted in a similar fashion to the first overaired zone. By eliminating the overaired zones, the air differential which was overairing the first zones can go into the underaired zones, 104A, 106A, 108A. Presumably the next zone will now be slightly overaired whereas the subsequent zones will still be somewhat underaired. The next zone will be adjusted until it is within the desired specification and so on until all zones have been adjusted for the number of cubic feet per minute desired.

In actual field trials, it was ascertained that a five-zone, two-story building which ordinarily requires a great deal of time and expense to zone balance could be fully zone balanced to the designed cubic feet per minute specifications in under 1 hour.

It is to be understood that the terms employed in this application are merely illustrative and are in no way meant to limit the range of equivalents which may be used within the scope and spirit of this application.

I claim:

1. Apparatus for measuring and controlling the flow of air in an air distribution system, comprising:
  a. a housing having opposed entrance and exit ends and being adapted to be installed in series with an air carrying duct system;
  b. damper means located within said housing adjacent the entrance end thereof and being adjustable to vary the volume of airflow through said housing between a maximum value and a minimum value;
  c. a total pressure measuring device mounted in said housing downstream of said damper, said total pressure measuring device comprising a hollow tube extending transversely across said housing from one sidewall of said housing to the other sidewall of said housing in a direction perpendicular to the flow of air therethrough and having at least two pairs of apertures facing directly into the direction of flow of air, the apertures of one of said pairs each being located within about 1 inch of a respective one of said sidewalls and the apertures of the other of said pairs each being located within about 2 to 7 inches of a respective one of said sidewalls, said tube being located downstream of said damper a selected distance at least great enough that turbulence of the airflow in said housing resulting from throttling action of said damper is reduced sufficiently for accurate measurement of total pressure by said total pressure measuring device;
  d. a screen located in said housing downstream of said hollow tube and having a multiplicity of air-admitting apertures, said screen extending across said housing transversely of the direction of flow of air whereby a pressure drop occurs across said screen;
  e. a static pressure measuring device located in said housing downstream of said screen;
  f. a differential pressure indicating device having two air inlets; and g. means intercoupling the opposite ends of said tube and one of said air inlets of said differential pressure indicating device and intercoupling said static pressure measuring device and the other air inlet of said differential pressure indicating device whereby said differential pressure indicating device can indicate the calibration pressure existing within said housing between said total pressure measuring device and said static pressure measuring device as a measure of the volume of air flowing through said housing.

2. Apparatus for measuring and controlling the flow of air in an air distribution system, comprising:
 a. a housing having opposed entrance and exit ends and being adapted to be installed in series with an air carrying duct system;
 b. damper means located within said housing adjacent the entrance end thereof and being adjustable to vary the volume of airflow through said housing between a maximum value and a minimum value; and
 c. means for indicating the calibration pressure within said housing as a measure of the volume of airflow through said housing comprising:
  1. a total pressure measuring device mounted in said housing downstream of said damper a selected distance at least sufficient to permit accurate measurement of total pressure, said total pressure measuring device comprising a hollow tube extending transversely across said housing from one sidewall of said housing to the other sidewall of said housing in a direction perpendicular to the flow of air therethrough and having two pairs of apertures facing directly into the direction of flow of air, the apertures of one of said pairs each being located within about 1 inch of a respective one of said sidewalls and the apertures of the other of said pairs each being located within about 2 to 7 inches of a respective one of said sidewalls;
  2. a screen located in said housing downstream of said hollow tube and having a multiplicity of apertures, said screen extending across said housing transversely to the direction of flow of air, the open area provided by said apertures in said screen being less than one-half the cross sectional area of said housing at the location of said screen whereby a pressure drop occurs across said screen;
  3. a static pressure measuring device located in said housing downstream of said screen;
  4. a differential pressure indicating device having two air inlets; and
  5. means intercoupling the opposite ends of said tube and one of said air inlets of said differential pressure indicating device and intercoupling said static pressure measuring device and the other air inlet of said differential pressure indicating device whereby said differential pressure indicating device can indicate the calibration pressure existing within said housing between said total pressure measuring device and said static pressure measuring device.

* * * * *